(12) United States Patent
Fukazu et al.

(10) Patent No.: US 8,294,293 B2
(45) Date of Patent: Oct. 23, 2012

(54) HIGH-VOLTAGE ELECTRICAL COMPONENT UNIT FOR VEHICLES

(75) Inventors: Tomohiro Fukazu, Utsunomiya (JP);
Hiroyasu Takizawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 556 days.

(21) Appl. No.: 12/625,081

(22) Filed: Nov. 24, 2009

(65) Prior Publication Data

US 2010/0127565 A1 May 27, 2010

(30) Foreign Application Priority Data

Nov. 25, 2008 (JP) ................................. 2008-299283

(51) Int. Cl.
*B60L 1/00* (2006.01)
(52) U.S. Cl. ........................ 307/10.1; 136/230; 180/68.5
(58) Field of Classification Search ................. 180/68.5;
307/9.1, 10.1; 320/104; 136/230
See application file for complete search history.

(56) References Cited

U.S. PATENT DOCUMENTS

| 5,504,655 A * | 4/1996 | Underwood et al. ......... 361/707 |
| 6,396,380 B1 * | 5/2002 | Girke et al. .................. 337/189 |
| 6,965,514 B2 * | 11/2005 | Beihoff et al. ................ 361/699 |
| 2010/0175940 A1 * | 7/2010 | Taneda et al. ................ 180/68.5 |
| 2012/0073888 A1 * | 3/2012 | Taneda et al. ................ 180/68.5 |

FOREIGN PATENT DOCUMENTS

| JP | 2001-23700 A | 1/2001 |
| JP | 2005-153827 A | 6/2005 |
| JP | 2007-89259 A | 4/2007 |
| JP | 2008-062780 A | 3/2008 |
| JP | 2008-220017 A | 9/2008 |

* cited by examiner

*Primary Examiner* — John D. Walters
*Assistant Examiner* — James Triggs
(74) *Attorney, Agent, or Firm* — Arent Fox LLP

(57) ABSTRACT

Provided is a high-voltage electrical component unit for vehicles, including: an electrical storage device; a power control block disposed above the electrical storage device for controlling input-output power of the electrical storage device; and a power distribution block disposed across both side portions of the electrical storage device and the power control block for electrically connecting the electrical storage device and the power control block, the electrical storage device, the power control block and the power distribution block being fastened to one another, wherein a temporarily fastening section is provided at a separately-provided conductive functional component which electrically connects a connection terminal of the power distribution block and a connection terminal of the power control block, the temporarily fastening section engaging to both the power control block and the power distribution block to hold relative positions thereof.

7 Claims, 10 Drawing Sheets

HIGH-VOLTAGE ELECTRICAL COMPONENT UNIT FOR VEHICLES

BACKGROUND OF INVENTION

1. Technical Field of the Invention

The present invention relates to a high-voltage electrical component unit for vehicles that supplies electric power to, for example, a motor for driving a vehicle.

Priority is claimed on Japanese Patent Application No. 2008-299283, filed Nov. 25, 2008, the content of which is incorporated herein by reference.

2. Background Art

Hybrid vehicles and fuel cell vehicles have a high-voltage battery (i.e., a high-voltage electrical storage device) mounted thereon as a power supply for driving vehicles in addition to a low-voltage battery as a power supply for auxiliary machines.

Electric power in the high-voltage battery relays battery protection circuits, such as a contactor and a fuse, and is output to a motor for driving a vehicle via an inverter-based power driven unit (PDU). The electric power is partially stepped down by a DC-DC converter and is charged in the low-voltage battery.

A high-voltage battery (hereinafter, referred to as an "electrical storage device") is usually assembled integrally with both a power control block on which the PDU and the DC-DC converter are mounted and a power distribution block on which a contactor or other components are mounted. The electrical storage device is mounted on a vehicle as a high-voltage electrical component unit.

A high-voltage electrical component unit has been proposed in which a power distribution block is assembled integrally with an electrical storage device and a power control block is assembled to the power distribution block at a side opposite to the electrical storage device (for example, see Japanese Unexamined Patent Application, First Publication No. 2005-153827).

In this high-voltage electrical component unit, a locking claw is provided in the power distribution block at a side of the electrical storage device. The locking claw is latched to a groove formed in the electrical storage device for temporary fastening. In this state, the power distribution block and the electrical storage device are finally fastened to each other. The locking claw in the power distribution block is disposed at a lower side when the unit is assembled to a vehicle. In particular, when the power distribution block is fastened to the electrical storage device, both of these components are first turned upside down. In this state, the locking claw located at an upper side is latched to the groove formed on the electrical storage device. Then, the power distribution block and the electrical storage device are finally fastened to each other with, for example, bolts. Disposing the power distribution block and the electrical storage device upside down during assembling and mounting is due to followings. Heavy components, such as the contactor and switches, on the power distribution block are disposed at an upper side when the unit is mounted on a vehicle. Therefore, if the power distribution block and the electrical storage device are temporarily fastened to each other with the locking claw being engaged to the groove without being turned upside down, it is difficult to keep these components aligned with each other (i.e., the power distribution block collapses easily). That is, disposing these components upside down for temporary fastening of the power distribution block and the electrical storage device helps keeping these components in a stable temporarily fastening state with their own weight.

As another approach, a high-voltage electrical component unit has been proposed in which a power control block is assembled on an electrical storage device when the unit is mounted on a vehicle and a power distribution block is mounted across both side portions of the electrical storage device and the power control block (see Japanese Unexamined Patent Application, First Publication No. 2008-62780).

In this latter high-voltage electrical component unit, however, since the electrical storage device, which is a heavy component, is disposed below the power control block, when the electrical storage device and the high-voltage electrical component block are turned upside down along with the power distribution block during assembling as in the former high-voltage electrical component unit, the entire weight of the electrical storage device is applied to the power control block. This phenomenon is unfavorable from the viewpoint of protection of the high-voltage electrical component unit (the power control block).

Accordingly, in the latter high-voltage electrical component unit, an assembly block, which is configured by assembling the electrical storage device and the power control block together, and the power distribution block are assembled together without being turned upside down. In this case, however, it is difficult to keep the power distribution block aligned with the assembly block in a temporarily fastened state by only the locking claw of the power distribution block engaged to the groove formed in the electrical storage device. Especially in the latter high-voltage electrical component unit, since the electrical storage device and the power control block are stacked vertically to increase height thereof, the power distribution block assembled thereto may easily collapse during temporary fastening because the position of the center of gravity of the power distribution block becomes high.

SUMMARY OF THE INVENTION

It is an object of the invention to provide a high-voltage electrical component unit for vehicles with improved assemblability, in which a power distribution block can be temporarily fastened easily and reliably during assembly.

(1) A first aspect of the invention is a high-voltage electrical component unit for vehicles, including: an electrical storage device; a power control block disposed above the electrical storage device for controlling input-output power of the electrical storage device; and a power distribution block disposed across both side portions of the electrical storage device and the power control block for electrically connecting the electrical storage device and the power control block, the electrical storage device, the power control block and the power distribution block being fastened to one another, wherein a temporarily fastening section is provided at a separately-provided conductive functional component which electrically connects a connection terminal of the power distribution block and a connection terminal of the power control block, the temporarily fastening section engaging to both the power control block and the power distribution block to hold relative positions thereof.

According to the aspect (1) of the invention, a temporarily fastening section is provided in a separately-provided conductive functional component which electrically connects the connection terminal of the power distribution block and the connection terminal of the power control block. The temporarily fastening section is engaged to both the power control block and the power distribution block to control the relative positions of these blocks. Therefore, during assembly of the electrical storage device, the power control block and the power distribution block, the power distribution block is temporarily fastened to the power control block by the conductive functional component. In this state, the power distribution block is fastened finally to the power control block and to the electrical storage device. Since the power distribution block is temporarily fastened to the power control block by the separately-provided conductive functional component, the temporary fastening can be conducted easily and reliably from a direction perpendicular to an assembling direction. Since the connection terminal of the power control block and the connection terminal of the power distribution block are electrically connected to each other by the conductive functional component that has the temporarily fastening section, the high-voltage electrical component unit includes no extra components.

Accordingly, the aspect (1) of the invention has improved assemblability with no extra components and thus no increase in product cost and weight.

(2) In the aspect (1) of the invention, it is preferable that the temporarily fastening section of the conductive functional component may preferably includes fastening section fastened to the power control block and a locking piece which engages with the power distribution block to control separation of the power distribution block from the power control block.

In the high-voltage electrical component unit described in (2), the conductive functional component includes both the fastening section to be fastened to the power control block and a locking piece which engages with the power distribution block, which altogether constitute the temporarily fastening section. The fastening section can therefore be fastened to the power control block with the locking piece being latched to the power distribution block. Accordingly, the power distribution block can be temporarily fastened more easily to the power control block.

(3) In the aspect (1) of the invention, it is preferable that the power control block may preferably include a power controlling section through which a high-voltage current flows and a cover member which covers an outside of the power controlling section and the conductive functional component may preferably be fastened to the power control block with the cover member disposed therebetween.

In the high-voltage electrical component unit described in (3), the cover member of the power control block cannot be removed unless the conductive functional component is removed. Accordingly, unless the conductive functional component is removed to block the electric power supply during maintenance, the cover member is not opened and the power controlling section is not exposed. As a result, safety during maintenance is further increased.

(4) In the aspect (3) of the invention, it is preferable that the power control block may preferably further include a base member disposed at an upper portion of the electrical storage device and the power controlling section is disposed between the base member and the cover member; the cover member may preferably include a first through hole and a second through hole; a locking projection which protrudes through the first through hole may preferably be provided at a position corresponding to the first through hole in the base member; a fastening hole, which is concentric with the second through hole, may preferably be provided at a position corresponding to the second through hole in the base member; and the conductive functional component may preferably include a temporarily fastening hole and an insertion hole. The locking projection protruding from the first through hole may preferably be fit into the temporarily fastening hole and a fastening member, which is screwed into the fastening hole through the second through hole, being inserted in the insertion hole.

In the high-voltage electrical component unit described in (4), the conductive functional component is roughly positioned with respect to the power control block by fitting the locking projection of the base member into the temporarily fastening hole of the conductive functional component. In this state, the fastening member is inserted in the insertion hole of the conductive functional component and in the second through hole of the cover member. The conductive functional component is then fastened to the power control block by the fastening member. Accordingly, the conductive functional component can be temporarily fastened to the power distribution block easily and reliably.

(5) In the aspect (1) of the invention, it is preferable that a protruding section which guides mounting of the conductive functional component may preferably be provided adjacent to a mounting position of the conductive functional component in the power distribution block.

In the high-voltage electrical component unit described in (5), the conductive functional component can be temporarily fastened to the power distribution block while the conductive functional component being guided by the protruding section provided on the power distribution block. Accordingly, the conductive functional component can be temporarily fastened to the power distribution block easily and reliably.

(6) In the aspect (1) of the invention, it is preferable that an electrical connection section with the electrical storage device of the power distribution block may preferably be a connection terminal of the power distribution block protruding toward the electrical storage device.

In the high-voltage electrical component unit described in (6), the connection terminal of the power distribution block protrudes toward the electrical storage device to be electrically connected with the electrical storage device. It is therefore unnecessary to provide a separately-provided component dedicated for electrically connecting the power distribution block and the electrical storage device. Accordingly, the product cost for the separately-provided component which is no longer required can be eliminated.

(7) In the aspect (1) of the invention, it is preferable that the power control block may preferably include an inverter which controls a motor and a DC-DC converter which converts voltage of the electrical storage device; the power distribution block may preferably include a functional section for protecting the electrical storage device which includes a sensor section for detecting overcurrent and a contactor section for blocking an output circuit of the electrical storage device when the overcurrent is detected by the sensor section; the conductive functional component may preferably connect the functional section for protecting the electrical storage device of the power distribution block with the inverter and with the DC-DC converter of the power control block; and, when the conductive functional component is removed, electrical connection between the electrical storage device and the power control block via the functional section for protecting the electrical storage device of the power distribution block may preferably be blocked.

In the high-voltage electrical component unit described in (7), since electrical connection between the electrical storage device and the power control block via the functional section for protecting the electrical storage device is blocked when the conductive functional component is removed, safety during maintenance of the inverter or the DC-DC converter can further be improved.

PREFERRED EMBODIMENTS

Figure 1:
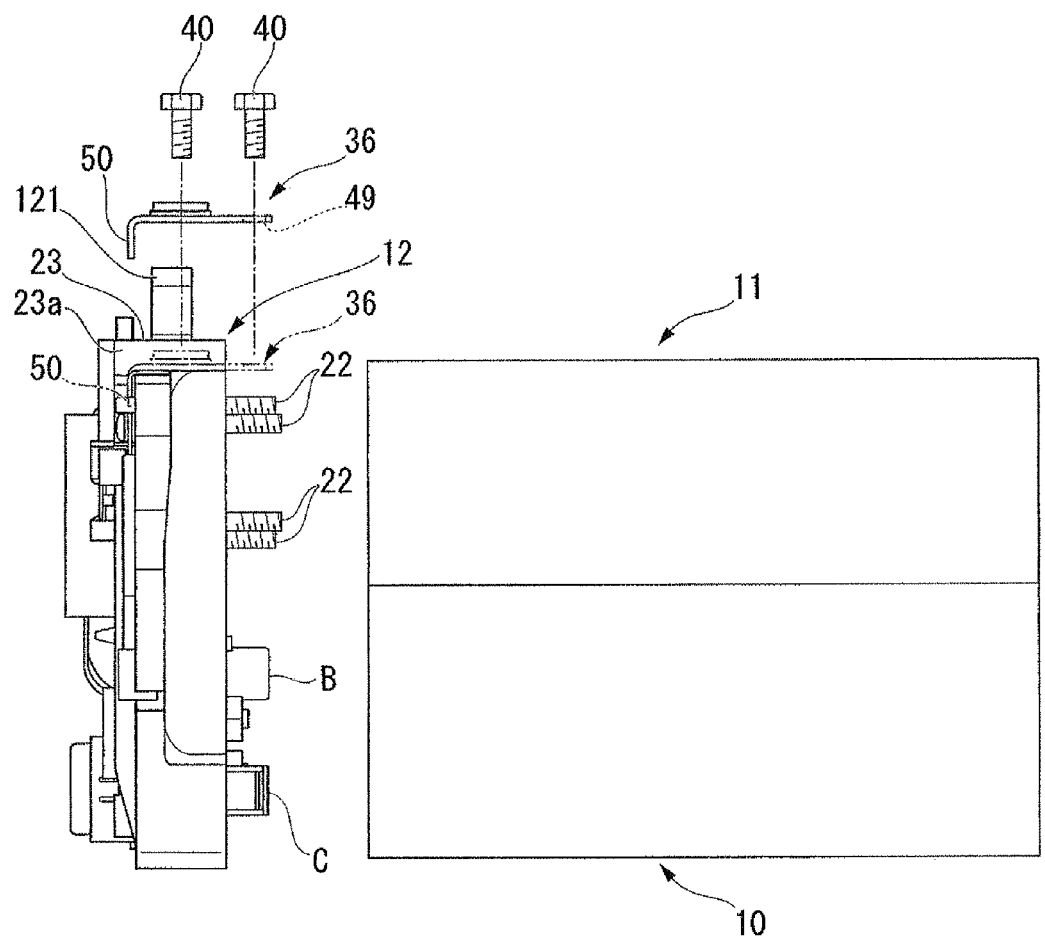
FIG. 1 is an exploded side view of a high-voltage electrical component unit according to an embodiment of the invention.

Referring now to the drawings, an embodiment of the invention will be described.

Figure 2:
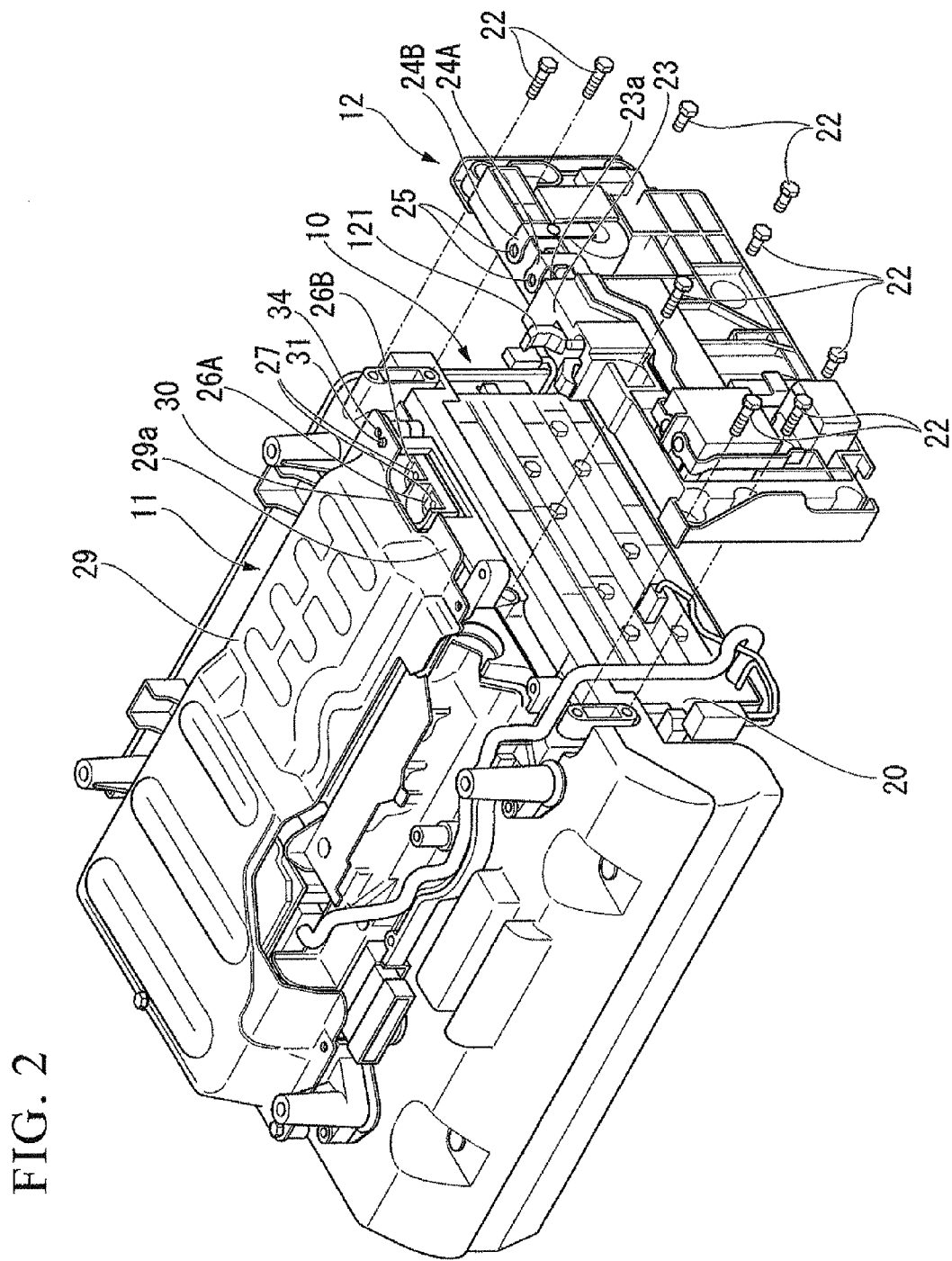
FIG. 2 is an exploded perspective view of the high-voltage electrical component unit according to the embodiment.
Figure 3:
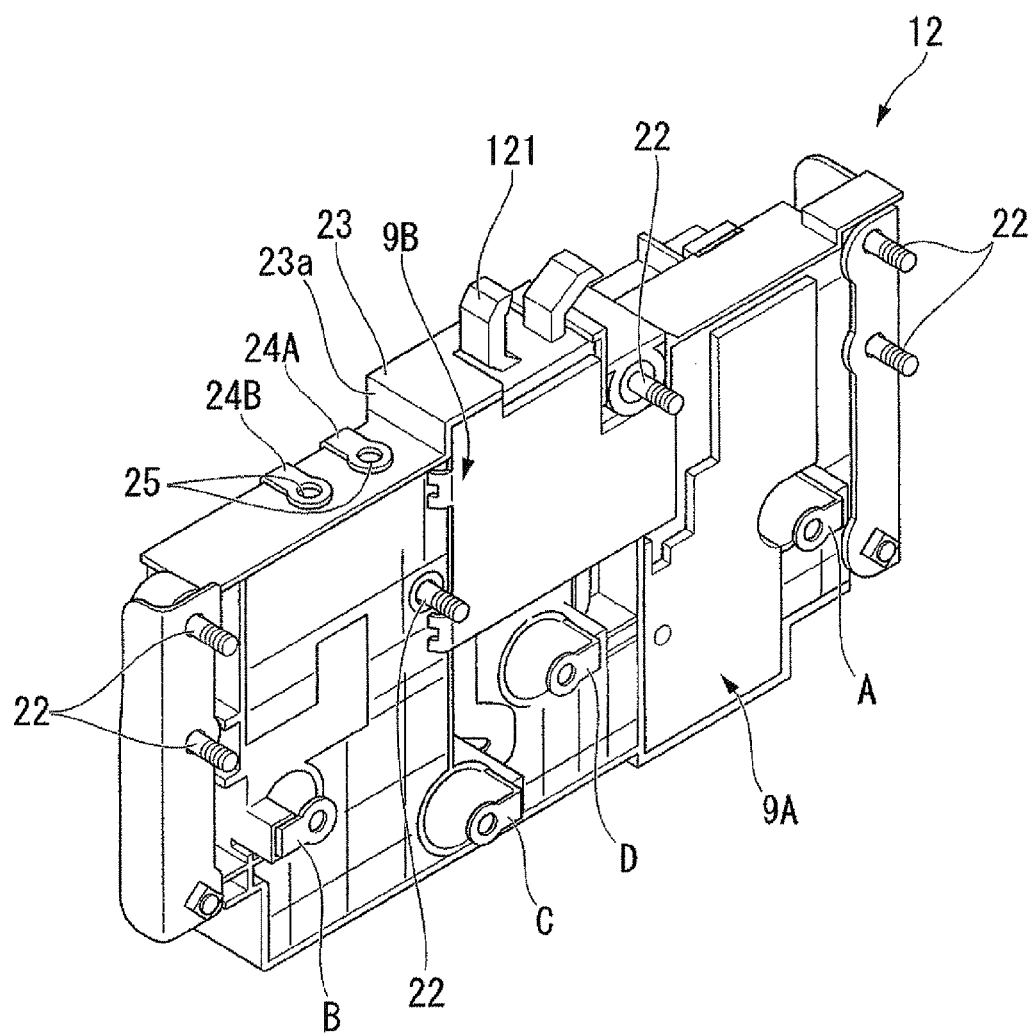
FIG. 3 is a perspective view of the power distribution block according to the embodiment.

A high-voltage electrical component unit 1 for vehicles according to the present embodiment (hereinafter, referred to as "high-voltage electrical component unit 1") is used as a high-voltage power supply for driving vehicles, such as hybrid vehicles and fuel cell vehicles. As illustrated in FIGS. 1 to 3, the high-voltage electrical component unit 1 includes an electrical storage device 10 (i.e., a high-voltage battery), a power control block 11 and a power distribution block 12. The electrical storage device 10 keeps high-voltage electric power used by a vehicle. The power control block 11 mainly controls input and output electric power (i.e., supplied power and regenerative power) of the electrical storage device 10. The power distribution block 12 electrically connects the electrical storage device 10 and the power control block 11.

Figure 4:
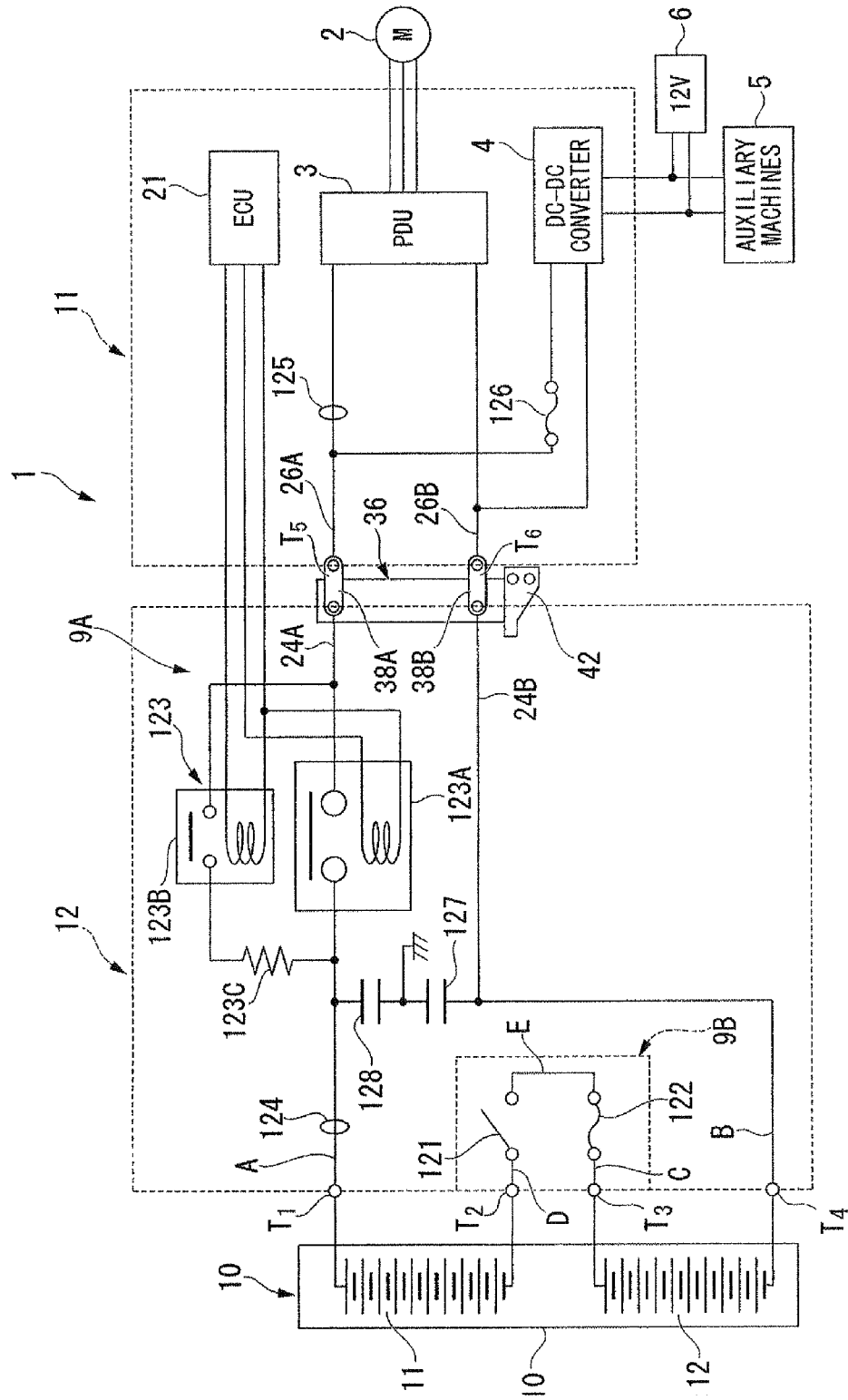
FIG. 4 is a circuit diagram of the high-voltage electrical component unit according to the embodiment.

FIG. 4 is an electrical circuit diagram of the high-voltage electrical component unit 1. A circuit configuration of the high-voltage electrical component unit 1 will be described first.

As illustrated in FIG. 4, the electrical storage device 10 includes a first electrical storage module 111 and a second electrical storage module 112. The first electrical storage module 111 is configured by plural serially-connected cells. A positive pole of the first electrical storage module 111 and a negative pole of the second electrical storage module 112 are connected to a battery protection circuit 9A (i.e., a functional section for protecting the electrical storage device) in the power distribution block 12 via junction points T1 and T4, respectively. A negative pole of the first electrical storage module 111 and a positive pole of the second electrical storage module 112 are connected to a switching circuit 9B in the power distribution block 12 via junction points T2 and T3, respectively.

The switching circuit 9B connects the first electrical storage module 111 and the second electrical storage module 112 in series as will be described in detail later.

The power control block 11 includes a PDU 3, a DC-DC converter 4 and a battery ECU 21. The PDU 3 controls supplied power to a motor 2 for driving a vehicle and regenerative power from the motor 2. The DC-DC converter 4 steps down the high-voltage electric power of the electrical storage device 10 so that the electric power is charged in a low-voltage battery 6 for use in auxiliary machines 5. The battery ECU 21 (i.e., a controlling device) controls electrical connection and disconnection between the electrical storage device 10 and the power control block 11 via the power distribution block 12.

The PDU 3 is a power drive unit configured mainly of an inverter circuit. The PDU 3 converts a direct current in the electrical storage device 10 into an alternating current when the motor 2, which is a three-phase alternating current motor for driving a vehicle, is supplied with electric power from the electrical storage device, which is a high-voltage direct current power supply. The PDU 3 also converts the alternating current generated by the motor 2 into a direct current when keeping a part of engine output or motion energy of a vehicle in the electrical storage device 10 via the motor 2. The direct current converted by the PDU 3, which is a high-voltage current, is partially stepped down by the DC-DC converter 4.

A current sensor 125 for detecting current input into the PDU 3 is provided at a positive line at the direct current side of the PDU 3. The current sensor 125 is connected to an input terminal of the battery ECU 21. A fuse 126 for short circuit protection of the DC-DC converter 4 is disposed at a positive line at the high-voltage side of the DC-DC converter 4.

The power distribution block 12 is connected to the electrical storage device 10 via the junction points T1 to T4 as described above and is connected to the power control block 11 via the junction points T5 and T6. The junction point T5 connects the positive lines of the power distribution block 12 and the power control block 11. The junction point T6 connects the negative lines of the power distribution block 12 and the power control block 11.

A contactor 123 is provided on the positive line connecting the junction points T1 and T5 of the power distribution block 12. The contactor 123 opens and closes the high-voltage circuit. The contactor 123 also protects the high-voltage circuit from over-current. The contactor 123 includes a main contactor 123A, a precharge contactor 123B and precharge resistance 123C. The main contactor 123A and the precharge contactor 123B are connected in parallel to each other.

A current sensor 124 (i.e., a sensor section for overcurrent detection) for detecting an incoming current from the electrical storage device 10 is provided between the junction point T1 and the contactor 123. A detection signal of the current sensor 124 is input to the battery ECU 21.

The battery ECU 21 controls the contactor 123 upon receiving an input signal from, for example, the current sensors 124 and 125. The battery protection circuit 9A includes the contactor 123 as a main component.

A negative line connecting the junction points T4 and T6 of the power distribution block 12 is connected to the ground via a capacitor 127 in order to reduce radio noise. Similarly, the positive line is connected to the ground via a capacitor 128.

A switching circuit 9B of the power distribution block 12 connects the junction point T2 at a negative pole side of the first electrical storage module 111 and the junction point T3 at a positive pole side of the second electrical storage module 112. The switching circuit 9B includes a main switch 121 and a main fuse 122 disposed in series. The main switch 121 turns the electrical storage device 100N and OFF and is blocked manually during maintenance.

In the power distribution block 12, the junction point T2 and the main switch 121 are connected by a bus plate D, and the junction point T3 and the main fuse 122 are connected by a bus plate C. The bus plates C and D are connection terminals made from conductive metal pieces. The main switch 121 and the main fuse 122 are connected by a bus plate E which is also made from a metal piece. One ends of the bus plates D and C protrude from a side surface of the power distribution block 12 toward the electrical storage device 10 to form the junction points T2 and T3, respectively, which will be described later. The junction points T1 and T4 in the power distribution block 12 are formed by the bus plates A and B (i.e., the connection terminals). One ends of the bus plates A and B protrude from the side surface of the power distribution block 12 toward the electrical storage device 10. The bus plates A and B are also formed by conductive metal pieces as in the bus plates C to E.

In this circuit configuration, the main switch 121 is turned ON when the electrical storage device 10 is to be connected to the PDU 3 and to the DC-DC converter 4. After the main switch 121 is turned ON, the precharge contactor 123B is turned ON and the precharge circuit is turned OFF in accordance with an instruction from the battery ECU 21. The current flowing through the precharge circuit is limited by the precharge resistance 123C. Then, in accordance with an instruction from the battery ECU 21, the main contactor 123A is turned ON and the main circuit is turned OFF.

Since the current is thus limited by the precharge circuit, welding of the main contactor 123A is avoided.

Next, structures of the components of the high-voltage electrical component unit 1 will be described.

The electrical storage device 10 includes a rectangular parallelepiped-shaped battery box 20 as illustrated in FIG. 2. The battery box 20 houses the first electrical storage module 111 and the second electrical storage module 112 disposed in parallel. The power control block 11 is fastened to an upper surface (i.e., a vertically upper surface when mounted on a vehicle) of the battery box 20 with, for example, bolts. A block configured by the electrical storage device 10 and the power control block 11 assembled integrally with each other is herein referred to as an "assembly block".

The power distribution block 12 is formed in a plate-like rectangular parallelepiped shape with one side being thinner than others. As illustrated in FIG. 2, the power distribution block 12 is assembled to a side surface of the assembly block with bolts 22 across the electrical storage device 10 and the power control block 11.

As illustrated in FIG. 3, the power distribution block 12 includes the bus plates A to D protruding from a surface (i.e., an internal surface) that is brought into contact with the assembly block. The bus plates A to D are connected to the battery protection circuit 9A and the switching circuit 9B in the power distribution block 12 as described above. Protruding ends of the bus plates A to D contact with corresponding terminals of the electrical storage device 10 and these are fastened with bolts when the power distribution block 12 is assembled to the assembly block. The protruding ends of the bus plates A to D are located almost the lower half of the power distribution block 12 corresponding to the position of the electrical storage device 10.

A rectangular parallelepiped-shaped elevated block 23 (i.e., a protruding section) is provided at a substantially upper central position of the power distribution block 12. An operating section of the main switch 121 is provided to protrude from an upper surface of the elevated block 23. The elevated block 23 includes a flat side surface along the thickness direction of the power distribution block 12. The flat side surface forms a mounting guide surface 23a of the connector 36, which will be described later.

A positive connection terminal 24A and negative connection terminal 24B of the battery protection circuit 9A, which are illustrated in the circuit diagram of FIG. 4, are disposed adjacent to the mounting guide surface 23a of the elevated block 23 of the upper surfaces of the power distribution block 12. The connection terminals 24A and 24B are disposed adjacent to each other on the upper surface of the power distribution block 12. The connection terminals 24A and 24B each include a bolt fastening hole 25.

A positive connection terminal 26A and a negative connection terminal 26B of the PDU 3 and the DC-DC converter 4, which are illustrated in the circuit diagram of FIG. 4, are disposed on an upper surface at an end of the power control block 11 adjacent to the power distribution block 12. The positive connection terminal 26A and a negative connection terminal 26B are disposed adjacent to each other. The connection terminals 26A and 26B each include a bolt fastening hole 27.

Figure 8:
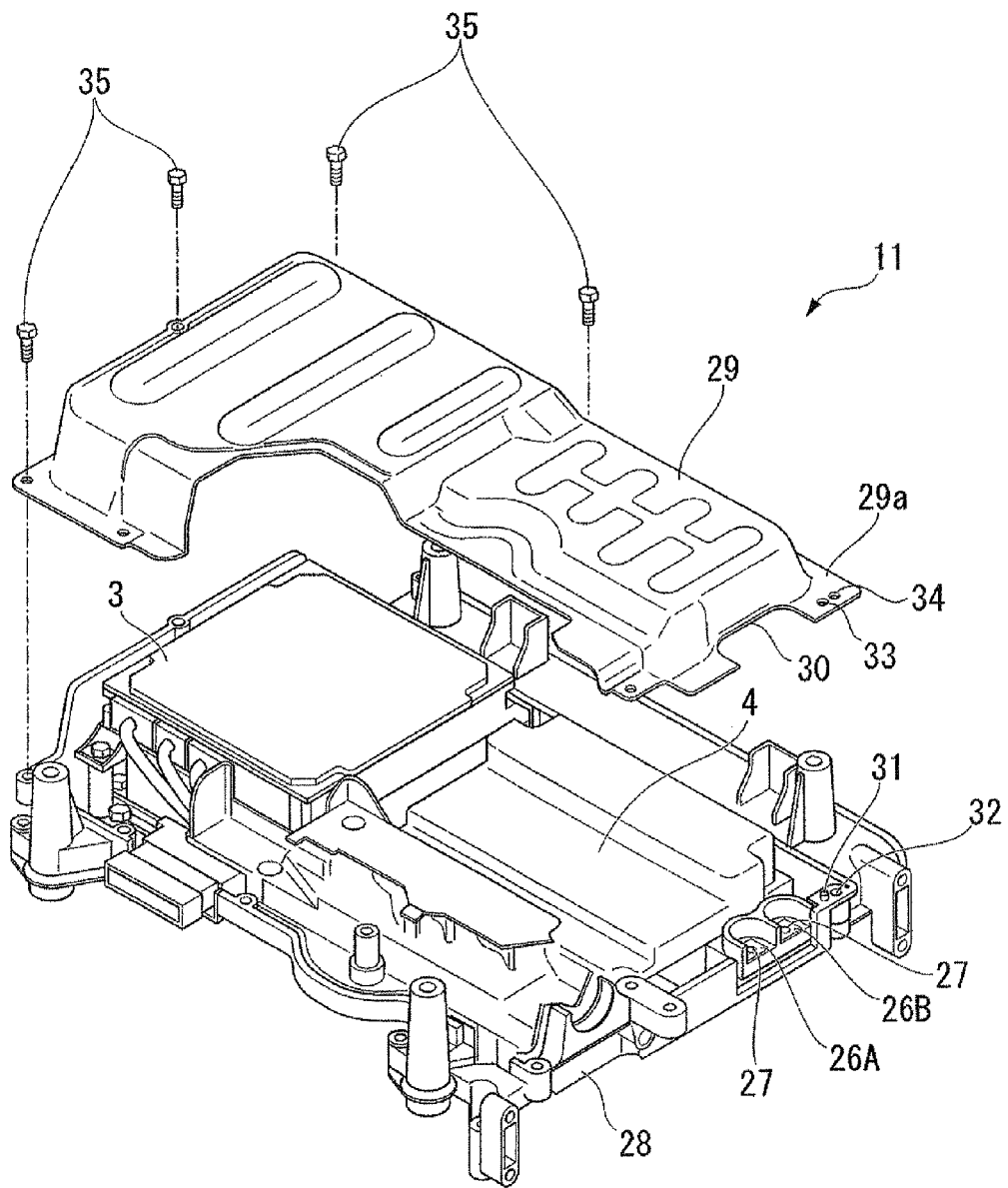
FIG. 8 is an exploded perspective view of the power control block according to the embodiment.

FIG. 8 is an exploded perspective view of the power control block 11.

As illustrated in FIG. 8, in the power control block 11, power controlling units (i.e., a power controlling section), such as the PDU 3 and the DC-DC converter 4, are mounted on an upper surface of a base plate 28 (i.e., a base member) which is fastened to an upper surface of the battery box 20 of the electrical storage device 10. A cover plate 29 (i.e., a cover member) is provided on the upper surface of the base plate 28 to cover the power controlling units. The connection terminals 26A and 26B of the PDU 3 and the DC-DC converter 4 are disposed at an upper end surface of the base plate 28. A joint flange 29 formed at an outer periphery of the cover plate 29 includes a notch 30 for exposing the connection terminals 26A and 26B.

A locking projection 31 is provided to protrude upward from a position adjacent to the connection terminal 26B at an edge of the base plate 28. A bolt fastening hole 32 is formed adjacent to the locking projection 31.

A first through hole 33 through which the locking projection 31 protrudes upward is formed on the joint flange 29a of the cover plate 29 at a position corresponding to the locking projection 31 on the base plate 28. A second through hole 34 is formed in the joint flange 29a at a position corresponding to the bolt fastening hole 32 on the base plate 28. The second through hole 34 is concentrically with the bolt fastening hole 32 when positioned appropriately. The cover plate 29 is aligned with and fastened to the base plate 28 by using bolts 35 with the locking projection 31 fit into the first through hole 33.

Figure 5:
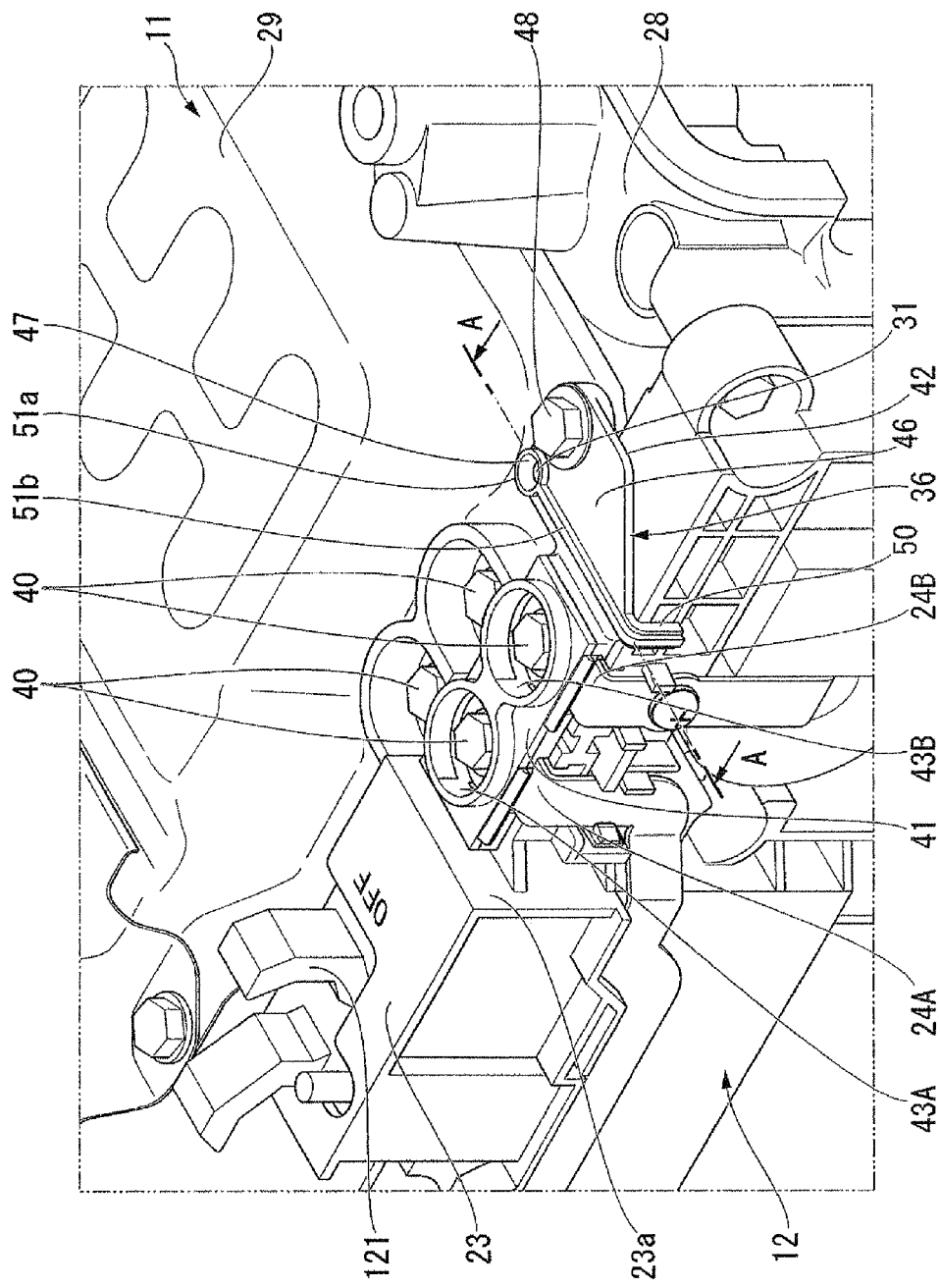
FIG. 5 is a perspective view of the high-voltage electrical component unit according to the embodiment.
Figure 7:
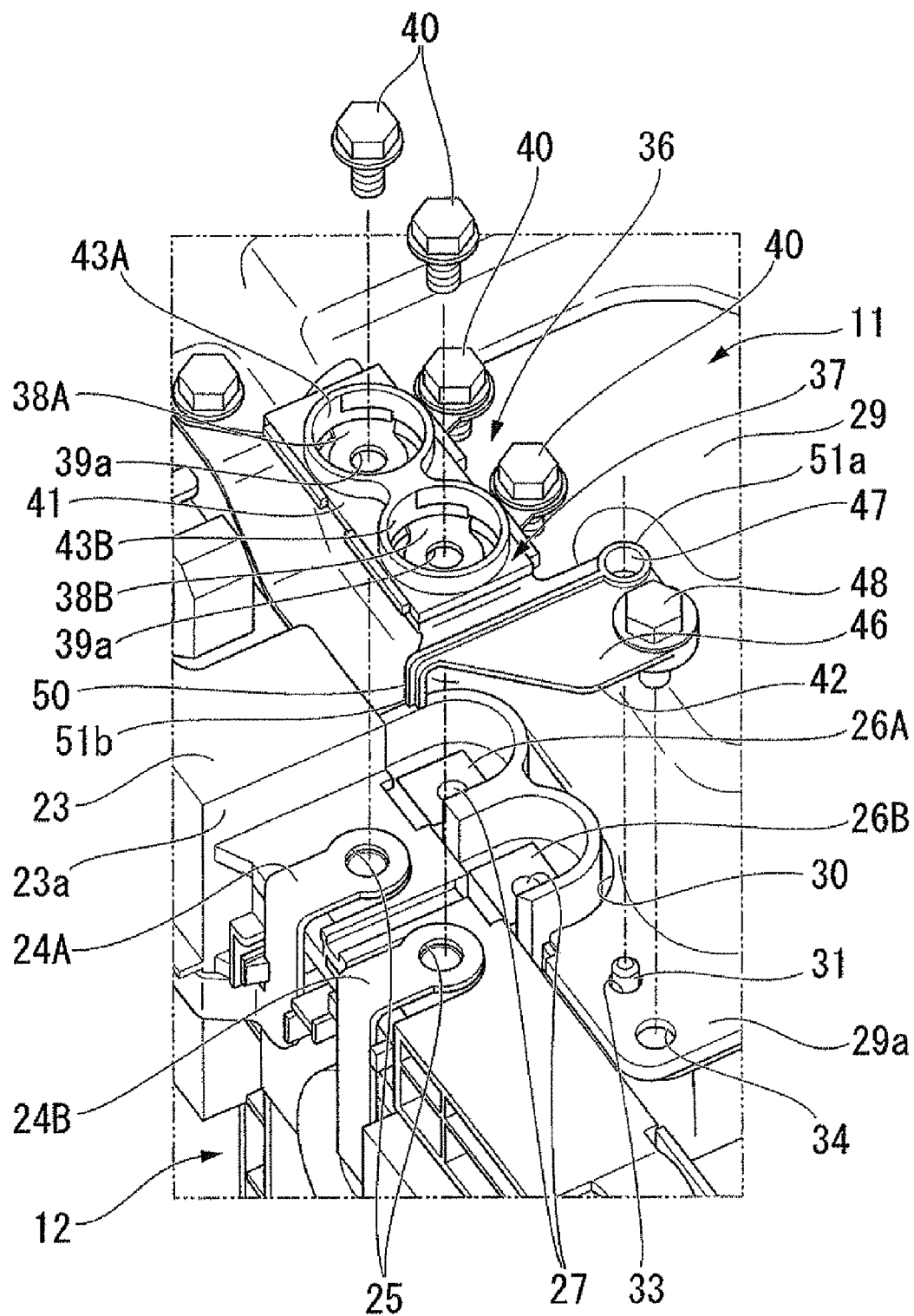
FIG. 7 is an exploded perspective view of the high-voltage electrical component unit according to the embodiment.

As illustrated in FIGS. 1, 5 and 7, the connection terminals 24A, 24B of the power distribution block 12 and the connection terminals 26A and 26B of the power control block 11 are electrically connected to each other by a connector 36, which is a conductive functional component.

Figure 9:
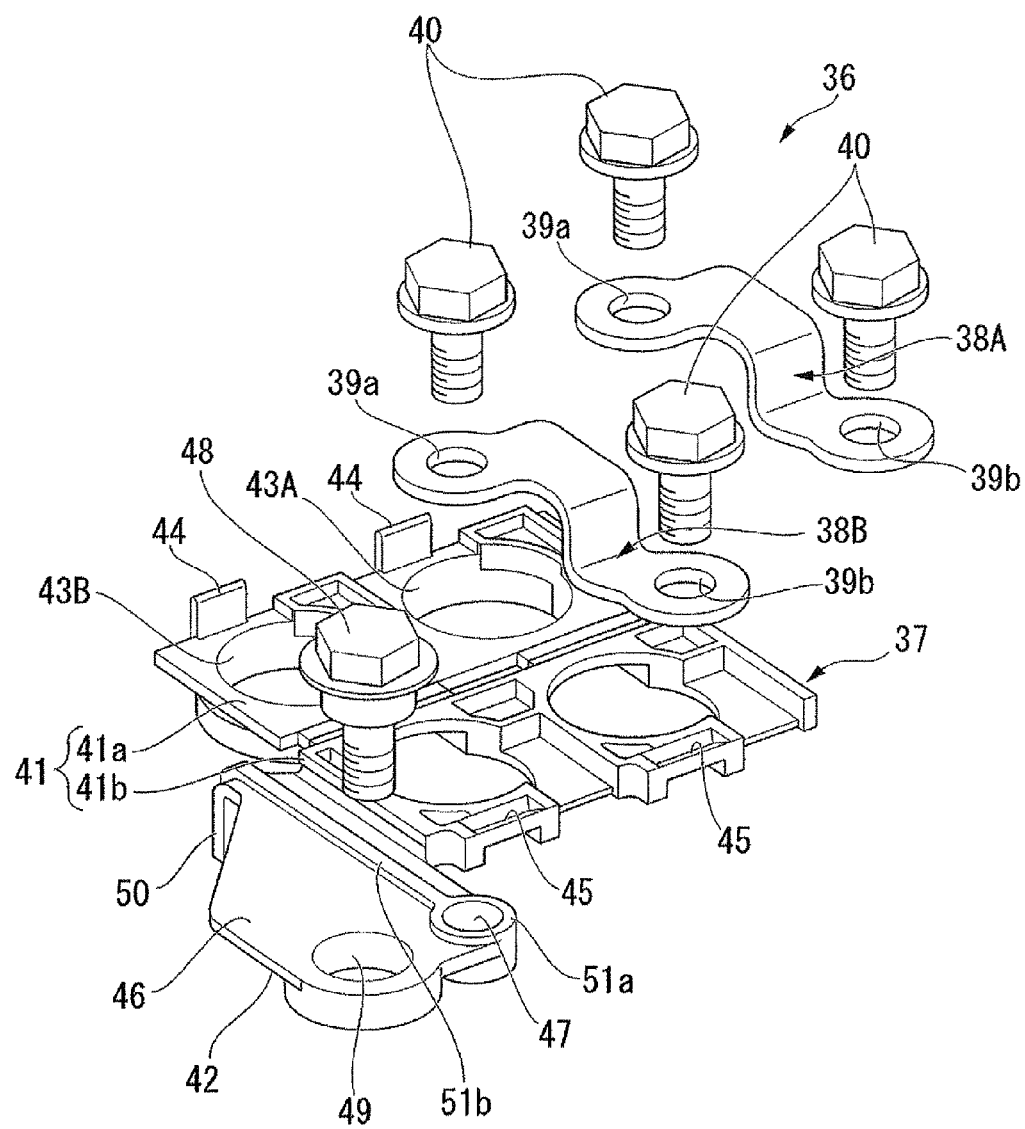
FIG. 9 is an exploded perspective view of a conductive functional component according to the embodiment.
Figure 10:
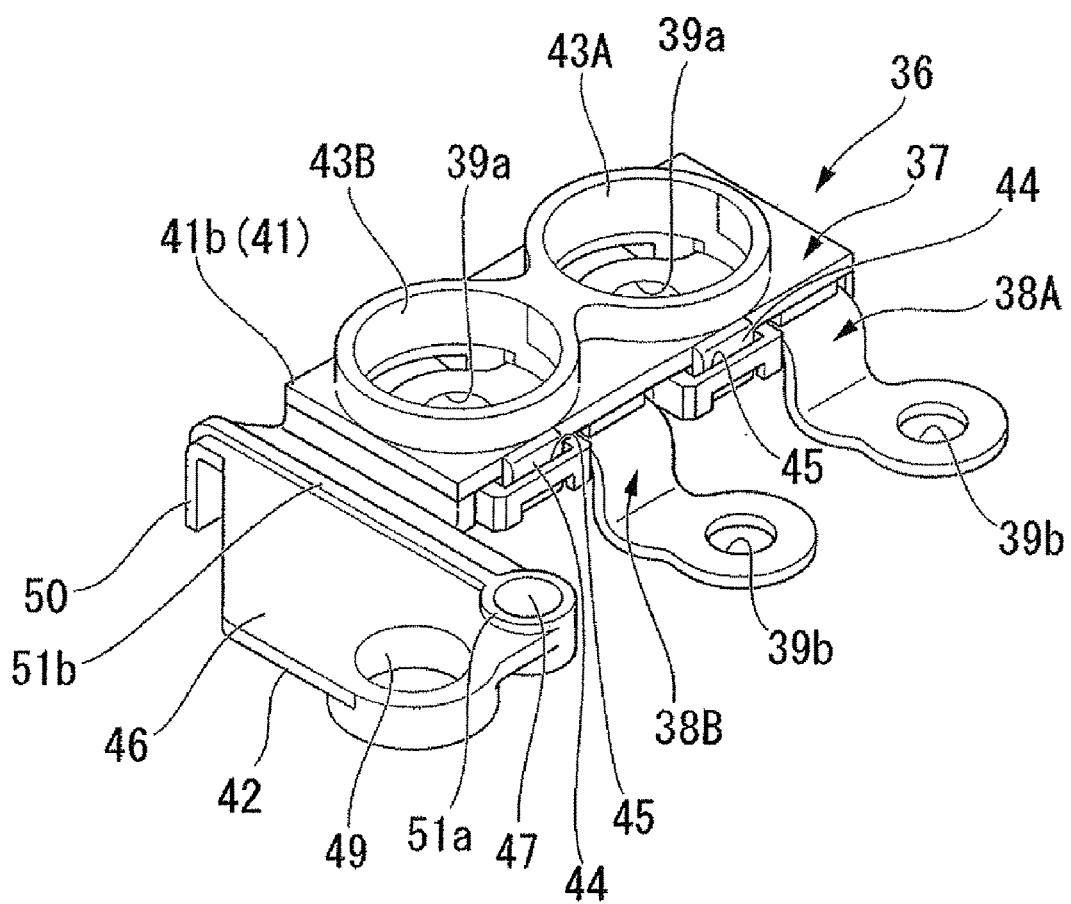
FIG. 10 i as perspective view of the conductive functional component according to the embodiment.

FIGS. 9 and 10 illustrate a structure of the connector 36 in detail.

As illustrated in FIGS. 9 and 10, the connector 36 includes a connector body 37 and a pair of bus plates 38A and 38B. The connector body 37 is made of non-conducting resin. The bus plates 38A and 38B are conductive metal pieces and are held by the connector body 37. The bus plates 38A and 38B electrically connect the connection terminal 24A and 24B of the power distribution block 12 and the connection terminals 26A and 26B of the power control block 11 corresponding to the connection terminals 24A and 24B.

The bus plates 38A and 38B each include insertion holes 39a and 39b at both ends thereof. Fastening bolts 40 are inserted in the insertion holes 39a and 39b.

The connector body 37 includes a plate holding section 41 and a temporarily fastening section 42. The plate holding section 41 holds one ends of the bus plates 38A and 38B. The temporarily fastening section 42 is engaged at upper portions of the power control block 11 and the power distribution block 12. As illustrated in FIG. 2, during assembly of the power distribution block 12 with the assembly block, the temporarily fastening section 42 is used to temporarily hold the power distribution block 12 with proper positioning to the assembly block before the power distribution block 12 is finally fastened to the assembly block with bolts 22.

The plate holding section 41 is divided into two sections: an upper wall 41a and a lower wall 41b, which are vertically opened and closed with a hinge. One ends of the upper wall 41a and the lower wall 41b are joined together with a hinge. The bus plates 38A and 38B are held between the upper wall 41a and the lower wall 41b. A pair of through holes 43A and 43B which continuously penetrate the upper wall 41a and the lower wall 41b are formed in the plate holding section 41. The ends of the bus plates 38A and 38B held in the plate holding section 41 are exposed through the through hole 43A and 43B, respectively. An insertion hole 39a formed at one end of each of the bus plates 38A and 38B is located in each of the through holes 43A and 43B of the plate holding section 41. The bolt 40 can be screwed from above the plate holding section 41 into the insertion hole 39a. As illustrated in FIGS. 9 and 10, locking claws 44 and engagement holes 45 engage with each other to keep the upper wall 41a and the lower wall 41b of the plate holding section 41 in a closed state.

The temporarily fastening section 42 is provided continuously from a side portion of the plate holding section 41. The temporarily fastening section 42 includes a plate-like base wall 46, a temporarily fastening hole 47 and an insertion hole 49 (i.e., a fastening section). The base wall 46 is superimposed on the upper surface of the power distribution block 12 and extends along the thickness direction of the power distribution block 12. The temporarily fastening hole 47 is disposed at an edge of one end of the base wall 46. The locking projection 31 of the power control block 11 is fit into the temporarily fastening hole 47. A bolt 48, which is a fastening member, is inserted in the insertion hole 49. The bolt 48 is inserted in an insertion hole 49 and in a second through hole 34 of the cover plate 29 and is screwed into the bolt fastening hole 32 of the base plate 28. Accordingly, the connector 36 is fastened to the power control block 11 with the cover plate 29 disposed therebetween (see FIG. 6).

Figure 6:
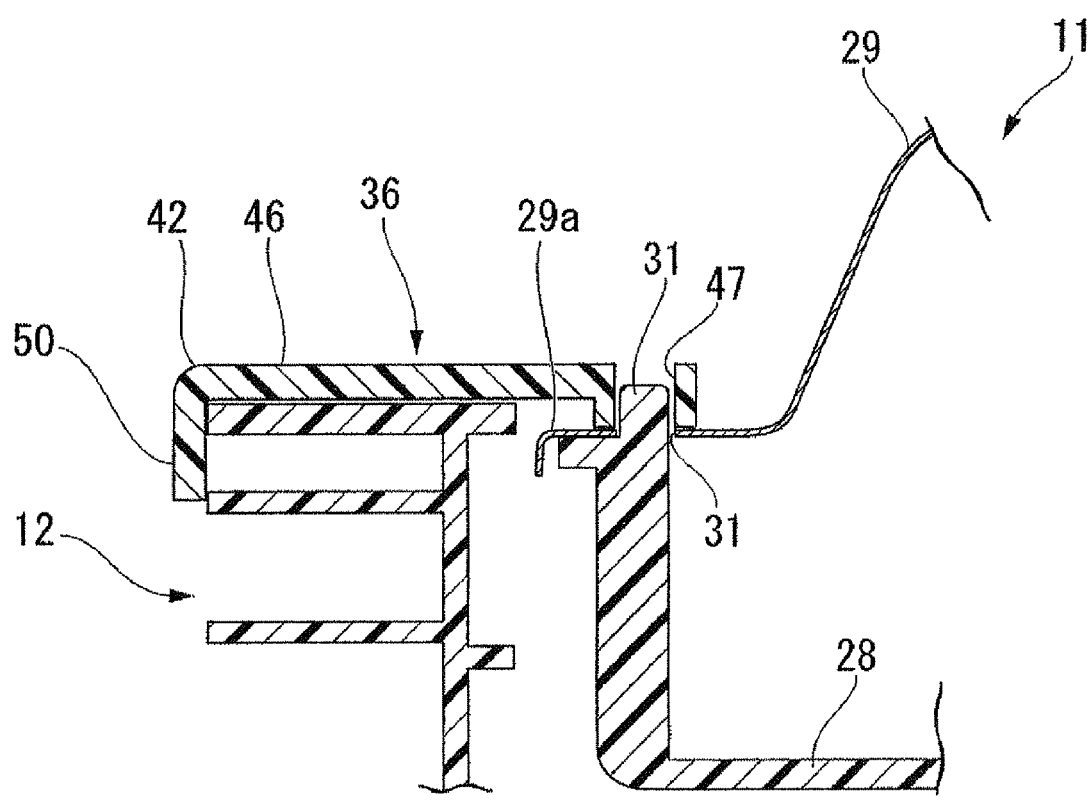
FIG. 6 is a cross-sectional view taken along line A-A in FIG. 5, illustrating the high-voltage electrical component unit according to the embodiment.

A substantially L-shaped locking piece 50 is provided to extend from an edge of the other end of the base wall 46. The locking piece 50 is configured such that an end portion thereof faces downward along the vertical direction when the locking piece 50 is engaged to the power distribution block 12 and, as illustrated in FIGS. 5 to 7, abuts an outer surface (i.e., a surface opposite to the power control block 11) of the power distribution block 12. The connector 36 is fastened to the power distribution block 12 by bolt 48 while collapse of the power control block 11 is controlled by the locking piece 50.

A circular reinforcing rib 51a and a linear reinforcing rib 51b are provided on an upper surface of the base wall 46 and the locking piece 50. The reinforcing rib 51a surrounds a periphery of the temporarily fastening hole 47. The reinforcing rib 51b extends from the reinforcing rib 51a toward an end portion of the locking piece 50.

When the thus-configured high-voltage electrical component unit 1 is assembled together, the power control block 11 is first assembled integrally with the upper portion of the electrical storage device 10 as illustrated in FIG. 1. The power distribution block 12 is assembled to a side portion of the thus-assembled assembly block. The connection terminals 24A and 24B on the upper surface of the power distribution block 12 and the connection terminals 26A and 26B on the power control block 11 corresponding to the connection terminals 24A and 24B are disposed adjacent to one another as illustrated in FIG. 7.

Then, the connector 36 is assembled to the power distribution block 12 and to the power control block 11 with ends of the bus plates 38A and 38B being aligned with the corresponding connection terminals 24A, 24B, 26A and 26B.

The connector 36 is assembled such that a side edge portion of the connector body 37 is aligned with mounting guide surface 23a of the elevated block 23 on the power distribution block 12 and the locking piece 50 is anchored on the outer surface of the power distribution block 12. Then, the locking projection 31 of the power control block 11 is fit into the temporarily fastening hole 47 of the connector 36. In this state, the bolt 48 is inserted in the insertion hole 49 of the connector 36 and is screwed into the bolt fastening hole 32 of the power control block 11. The connector 36 is thus fastened to the power control block 11 and the power distribution block 12 is temporarily fastened to the power control block 11 (i.e., the assembly block).

Then, the ends of the bus plates 38A and 38B of the connector 36 are fastened to the connection terminals 24A and 24B of the power distribution block 12 and to the connection terminals 26A and 26B of the power control block 11 with the bolts 40. In this manner, the battery protection circuit 9A in the power distribution block 12 and the PDU 3 and the DC-DC converter 4 in the power control block 11 are electrically connected via the connector 36.

After the power distribution block 12 is temporarily fastened to the power control block 11 via the connector 36 as described above, the power distribution block 12 is finally fastened to the electrical storage device 10 and to the power control block 11 with the bolts 22 as illustrated in FIGS. 1 and 2.

The ends of the bus plates A to D protruding from the internal surface of the power distribution block 12 are electrically connected to corresponding terminals of the electrical storage device 10.

In the high-voltage electrical component unit 1, the connector 36 which electrically connects the connection terminals 24A and 24B of the power distribution block 12 and the connection terminals 26A and 26B of the power control block 11 includes a substantially L-shaped locking piece 50 and an insertion hole 49 for fastening with the bolts. Thus, the connector 36 can be fastened to the upper surface of the power control block 11 with the locking piece 50 being anchored on the outer surface of the power distribution block 12. With this configuration, the power distribution block 12 can be temporarily fastened to the electrical storage device 10 and the power control block 11 easily and reliably before the power distribution block 12 is finally fastened to the electrical storage device 10 and the power control block 11.

The connector 36 is latched to upper portions of the power control block 11 and the power distribution block 12 along a direction substantially perpendicular to a direction in which the power control block 11 and the power distribution block 12 are aligned with each other. With this configuration, the power distribution block 12, which easily collapses because the position of the center of gravity thereof is high, can be restrained reliably with respect to the side surface of the power control block 11 and the electrical storage device 10. Accordingly, the high-voltage electrical component unit 1 has improved assemblability.

In the high-voltage electrical component unit 1, no components dedicated for temporarily fastening the power distribution block 12 and the power control block 11 are provided. Instead, the connector 36, which is a conductive functional component, integrally includes a structure for temporarily fastening. Accordingly, the high-voltage electrical component unit 1 has no extra components and there is thus no increase in product cost and weight.

The connector 36 may alternatively be temporarily fastened with bolts to both the power distribution block 12 and the power control block 11. However, in the high-voltage electrical component unit 1 according to the present embodiment, the substantially L-shaped locking piece 50 is anchored to the outer surface of the power distribution block 12 and the connector 36 is fastened to the power control block 11 with the bolts. In this manner, the power distribution block 12 can be temporarily fastened more easily to the power control block 11.

In the high-voltage electrical component unit 1, the connector 36 connects the battery protection circuit 9A in the power distribution block 12 and the PDU 3 and the DC-DC converter 4 in the power control block 11. When the connector 36 is removed, electrical connection among the electrical storage device 10, the PDU 3 and the DC-DC converter 4 via the battery protection circuit 9A is blocked. Accordingly, safety during maintenance of the PDU 3 or the DC-DC converter 4 is advantageously increased.

In the high-voltage electrical component unit 1, the connector 36 is fastened to the base plate 28 of the power control block 11 with the cover plate 29 of the power control block 11 disposed therebetween. Accordingly, when the cover plate 29 is opened for, for example, maintenance, the connector 36 must be removed and electrical connection with the electrical storage device 10 must be blocked. Accordingly, safety during maintenance is further increased.

In the high-voltage electrical component unit 1, in the power control block 11, the PDU 3 and the DC-DC converter 4 are disposed between the base plate 28 and the cover plate 29. In addition, the locking projection 31 provided in the base plate 28 can be inserted in the first through hole 33 of the cover plate 29 and fitted into the temporarily fastening hole 47 of the connector 36. The bolt 48 inserted in the insertion hole 49 of the connector 36 and in the second through hole 34 of the cover plate 29 is screwed into the bolt fastening hole 32 of the base plate 28. Accordingly, when the connector 36 is fastened to the power control block 11, the locking projection 31 of the power control block 11 is first fit into the temporarily fastening hole 47 of the connector 36 for temporal positioning and, in that state, the connector 36 is fastened to the power control block 11. With this configuration, the connector 36 can be temporarily fastened to the power control block 11 easily and reliably.

In the high-voltage electrical component unit 1, the elevated block 23 is provided to protrude upward in the power distribution block 12 at a position adjacent to the connector 36 is to be mounted. The side surface of the elevated block 23 serves as the mounting guide surface 23a for guiding the connector 36. With this configuration, the locking piece 50 of the connector 36 can be latched at an appropriate position on the power distribution block 12 easily and reliably while the connector 36 being guided by the elevated block 23. This configuration is also advantageous in making the temporarily fastening of the connector 36 easy.

In the high-voltage electrical component unit 1, the bus plates A to D of the power distribution block 12 is made to protrude toward the electrical storage device 10 and the protruding ends of the bus plates A to D are brought into direct contact with the connection terminals of the electrical storage device 10. With this configuration, the number of components can be reduced as compared with a case where a separately-provided conducting component is disposed between the connection terminals of the power distribution block 12 and the connection terminals of the electrical storage device 10. Accordingly, the product cost can also be reduced.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A high-voltage electrical component unit for vehicles, comprising:
    an electrical storage device;
    a power control block disposed above the electrical storage device for controlling input-output power of the electrical storage device; and
    a power distribution block disposed across both side portions of the electrical storage device and the power control block for electrically connecting the electrical storage device and the power control block,
    the electrical storage device, the power control block and the power distribution block being fastened to one another,
    wherein a temporarily fastening section is provided at a separately-provided conductive functional component which electrically connects a connection terminal of the power distribution block and a connection terminal of the power control block, the temporarily fastening section engaging to both the power control block and the power distribution block to hold relative positions thereof.

2. The high-voltage electrical component unit for vehicles according to claim 1, wherein the temporarily fastening section of the conductive functional component includes a fastening section fastened to the power control block and a locking piece which engages with the power distribution block to control separation of the power distribution block from the power control block.

3. The high-voltage electrical component unit for vehicles according to claim 1, wherein:
    the power control block includes a power controlling section through which a high-voltage current flows and a cover member which covers an outside of the power controlling section; and
    the conductive functional component is fastened to the power control block with the cover member disposed therebetween.

4. The high-voltage electrical component unit for vehicles according to claim 3, wherein:
    the power control block further includes a base member disposed at an upper portion of the electrical storage device and the power controlling section is disposed between the base member and the cover member;
    the cover member includes a first through hole and a second through hole;
    a locking projection which protrudes through the first through hole is provided at a position corresponding to the first through hole in the base member;
    a fastening hole, which is concentric with the second through hole, is provided at a position corresponding to the second through hole in the base member; and
    the conductive functional component includes a temporarily fastening hole and an insertion hole, the locking projection protruding from the first through hole being fit into the temporarily fastening hole and a fastening member, which is screwed into the fastening hole through the second through hole, being inserted in the insertion hole.

5. The high-voltage electrical component unit for vehicles according to claim 1, wherein a protruding section which guides mounting of the conductive functional component is provided adjacent to a mounting position of the conductive functional component in the power distribution block.

6. The high-voltage electrical component unit for vehicles according to claim 1, wherein an electrical connection section with the electrical storage device of the power distribution block is a connection terminal of the power distribution block protruding toward the electrical storage device.

7. The high-voltage electrical component unit for vehicles according to claim 1, wherein:
   the power control block includes an inverter which controls a motor and a DC-DC converter which converts voltage of the electrical storage device;
   the power distribution block includes a functional section for protecting the electrical storage device which includes a sensor section for detecting overcurrent and a contactor section for blocking an output circuit of the electrical storage device when the overcurrent is detected by the sensor section;
   the conductive functional component connects the functional section for protecting the electrical storage device of the power distribution block with the inverter and with the DC-DC converter of the power control block; and
   when the conductive functional component is removed, electrical connection between the electrical storage device and the power control block via the functional section for protecting the electrical storage device of the power distribution block is blocked.

* * * * *